United States Patent [19]

Iwabuchi et al.

[11] Patent Number: 4,987,505
[45] Date of Patent: Jan. 22, 1991

[54] MAGNETIC HEAD DEVICE HAVING PHOTO DETECTOR CELL

[75] Inventors: Yoshitaka Iwabuchi, Yamato; Yoshiyo Wada; Toshihiko Nishihata, both of Yokohama, all of Japan

[73] Assignee: Victor Company of Japan, Ltd., Yokohama, Japan

[21] Appl. No.: 259,706

[22] Filed: Oct. 19, 1988

[30] Foreign Application Priority Data

Oct. 19, 1987 [JP] Japan .................................. 62-159443
Oct. 19, 1987 [JP] Japan .................................. 62-263229

[51] Int. Cl.$^5$ ........................ G11B 5/60; G11B 5/187
[52] U.S. Cl. .................................. 360/103; 360/77.03
[58] Field of Search ........................... 360/103, 77.03

[56] References Cited

U.S. PATENT DOCUMENTS 4,570,191 2/1986 DeStefano et al. ............... 360/77.03

FOREIGN PATENT DOCUMENTS 56-22266   3/1981  Japan .
57-149913  9/1982  Japan .
57-163815 10/1982  Japan .
58-30969   8/1983  Japan .
61-20657   6/1986  Japan .
61-243982 10/1986  Japan .

Primary Examiner—Robert S. Tupper
Attorney, Agent, or Firm—Fleit, Jacobson, Cohn, Price, Holman & Stern

[57] ABSTRACT

A magnetic head device for recording signals onto a disk-shaped recording medium such as a floppy disk and reproducing them therefrom is provided. This magnetic head device comprises a magnetic converter unit for conversion of signals to and from a recording medium, a slider member for holding the magnetic converter unit, and a base body on which an optical track position sense unit for optically conducting track position control for the recording medium is affixed. The slider member has a transparent slider surface portion forming an optical path of the optical track position sense unit. A photo detector head chip for servo control used in a magnetic head device as mentioned above is also provided. This photo detector head chip is such that a plurality of light receiving element sections defining a light sensitive area for providing independent light detection signals depending upon a quantity of incident light, and light insensitive sections adjacent to the light sensitive area are alternately formed on the substrate surface, and that at least the light insensitive sections are covered thereon with a light shielding film of, for example, molybdenum or carbon having a small coefficient of reflection. The light shielding film may be formed by a method including the steps of depositing a light shielding material onto an insulating film on the light sensitive and insensitive sections, and applying patterning to the deposited light shielding material so that the light sensitive area is exposed.

6 Claims, 10 Drawing Sheets

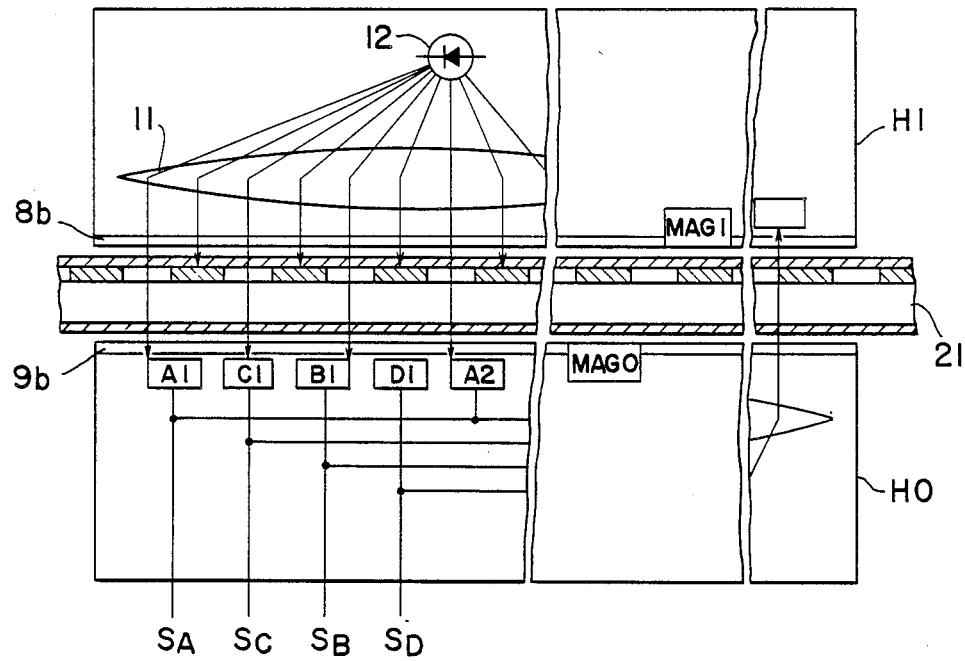
FIG. 10
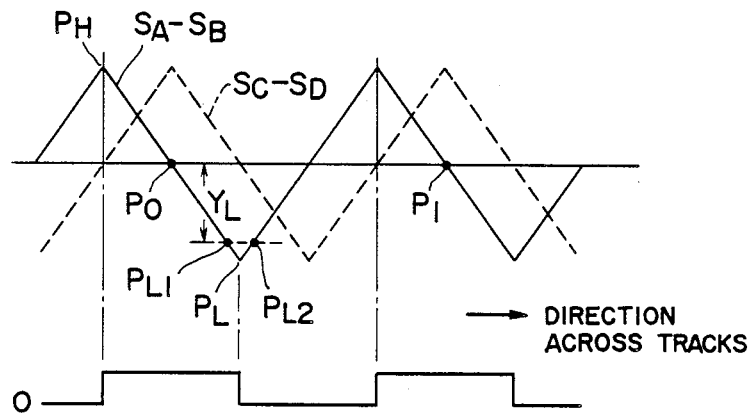
FIG. 11A
FIG. 11B 4,987,505

MAGNETIC HEAD DEVICE HAVING PHOTO DETECTOR CELL

BACKGROUND OF THE INVENTION

This invention relates to a magnetic head device for recording a signal onto a disk-shaped rotary recording medium and reproducing it therefrom, and more particularly, to a magnetic head device using jointly an optical servo and a photo detector cell for recording and reproducing.

A disk-shaped recording medium usually comprises a floppy or flexible disk (hereinafter simply referred to as a disk). A floppy disk drive (hereinafter simply referred to as a disk drive) is used for recording data to the disk and reproducing data from the disk. In recent years, it has become desirable to increase the memory capacity. By increasing the capacity of the disk, improvements in track density (TPI) and data density (BPI) became indispensable. Track density is dependent upon the precision of controlling an absolute position of the magnetic head with respect to the radial direction of disk.

Magnetic heads conventionally used have a Read/Write (hereinafter referred to as a R/W) core structure with a gap for R/W and a core structure for erasing fixed on a base body by means of adhesive agent. The core arrangement is mounted on a carriage through a gimbal support.

One method known for controlling the radial track position of such a magnetic head, comprises driving the carriage by means of a pulse motor, to perform a track seeking operation of the magnetic head through a stepping operation of the pulse motor. However, this method has limitations in use with disks having high density tracks. Therefore, a tracking servo system in which servo signals were recorded on a track was devised.

However, the available recording area for data signals is decreased due to the need to record servo signals. For this reason, it was realized that it is difficult to provide a disk drive which is applicable to the large capacity disk system.

SUMMARY OF THE INVENTION

An object of this invention is to provide a magnetic head device suitable in realizing a large capacity of a disk drive capable of precise tracking servo control (hereinafter simply referred to as a tracking servo).

Another object of this invention is to provide a photo detector cell suitable for use in the above-mentioned magnetic head device.

In accordance with one aspect of this invention, there is provided a magnetic head device comprising a slider member for holding a magnetic converter unit for converting signals to and from a recording medium, and a base body on which an optical track position sensor unit for optically conducting a track position control for the recording medium is affixed. The slider member has a transparent slider surface portion forming an optical path of the optical track position sensor unit.

Further, in accordance with another aspect of this invention, there is provided a photo detector head chip for servo control used in a magnetic head device. The head chip comprises a plurality of light receiving element sections defining a light sensitive area for providing light detection signals which are independent each other. The light detection signals of each section is dependent upon a quantity of light incident thereon.

The head chip further comprises light insensitive sections adjacent to the light sensitive area which are alternately formed on the surface of a substrate so that they are flush with each other. Preferably, at least the light insensitive sections are covered with a light shading or shielding film having a small coefficient of reflection.

The light shielding film is formed by a method including (a) a step of depositing a light shielding material having a small coefficient of reflection, onto an insulating film provided over the light sensitive sections and the light insensitive sections, and (b) a step for arranging the light shielding film material so that the light sensitive area is exposed.

In accordance with this invention, the tracking servo control of the magnetic head can be conducted by optical means. Therefore, high accuracy tracking servo control is possible and a magnetic disk drive system having a large capacity can be utilized. In addition, the magnetic converter unit is held by the slider member and the optical track position sensor unit is affixed to the base body. It is, therefore, possible to perform independent testing and/or adjustment thereof, to provide a magnetic head device that is easy to manufacture at low cost.

A photo detector head chip according to this invention is provided having light insensitive sections formed on the surface of a substrate and a portion of light sensitive sections adjacent to the light insensitive sections which are covered with a shielding film having a small coefficient of surface reflection. Accordingly, light incident to the light insensitive sections is absorbed by the shielding film such that scattering of light from the surface of the shielding film is suppressed. Error in the photo detector output due to the scattering of light is therefore reduced. A light detector head chip having a high resolution can thereby be provided.

BRIEF DESCRIPTION OF THE DRAWINGS

In the accompanying drawings:

FIG. 10 is a partial cross sectional view for explaining the servo operation in a magnetic disk device of this invention;

FIGS. 11A and 11B are signal diagrams showing positional error signals and optical tracks shown in FIG. 10;

DESCRIPTION OF THE PREFERRED EMBODIMENTS

Figure 1:
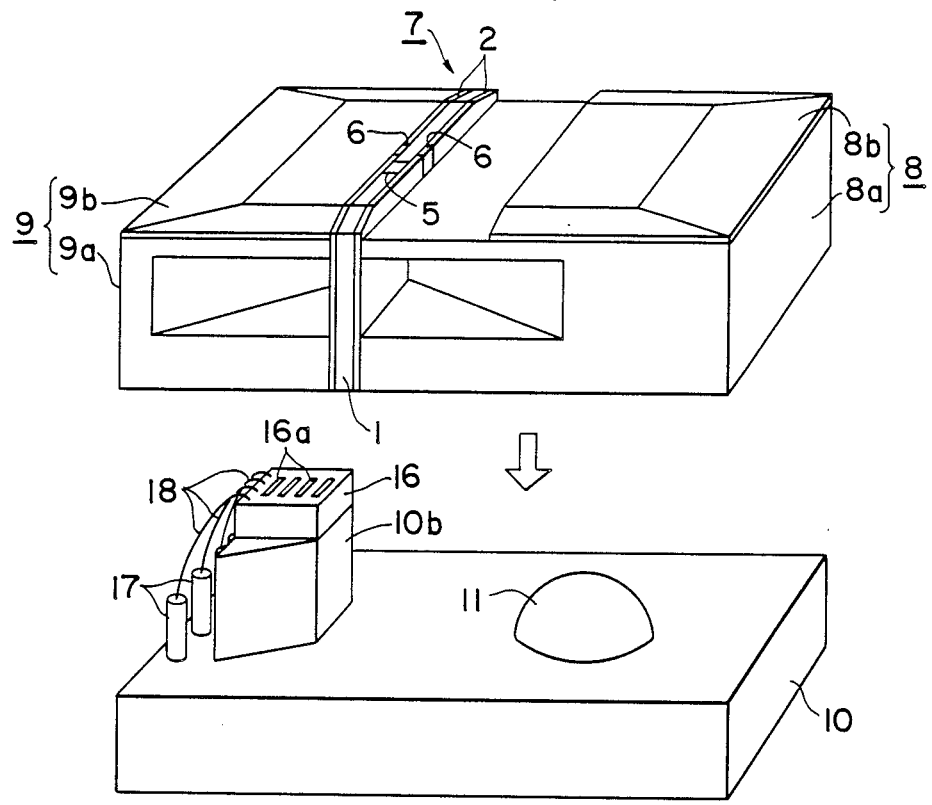
FIG. 1 is a partially perspective view showing a magnetic head device of an embodiment according to this invention.
Figure 2:
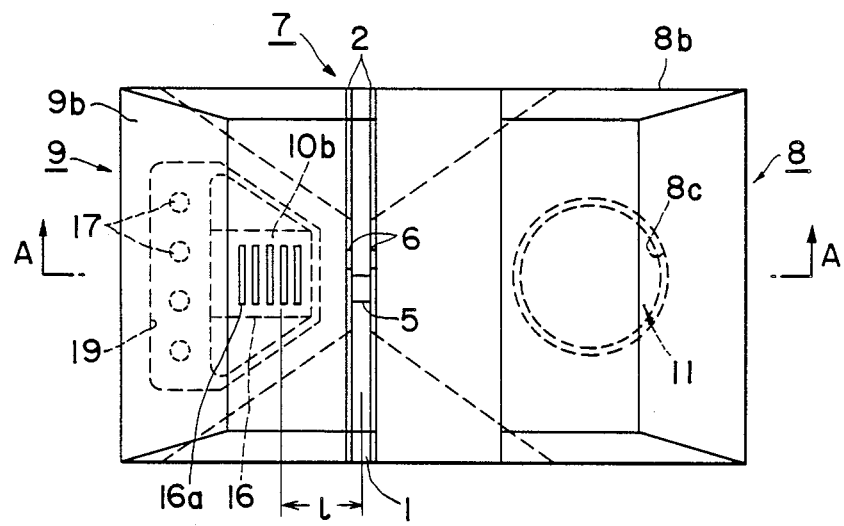
FIG. 2 is a plan view of a magnetic head device of an embodiment according to this invention.
Figure 3:
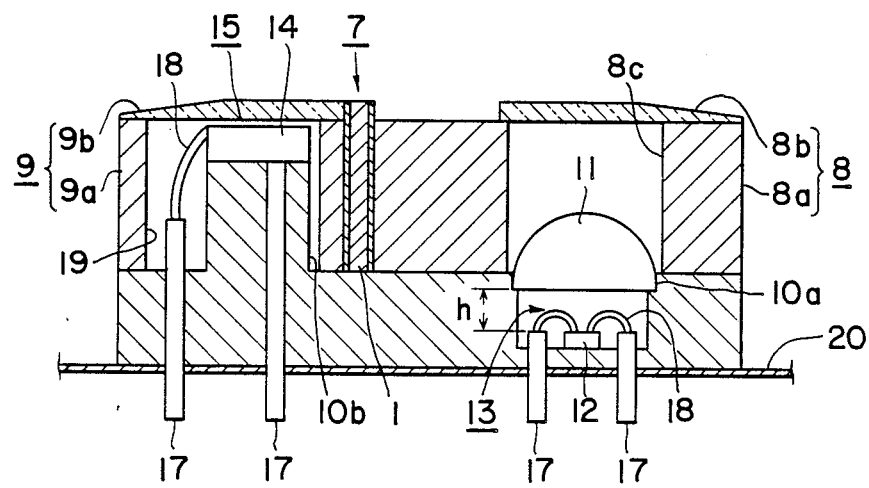
FIG. 3 is a cross sectional view taken along line A—A of FIG. 2.

FIG. 1 is a partially broken-down perspective view of a magnetic head device according to this invention, FIG. 2 is a plan view of FIG. 1, and FIG. 3 is a cross sectional view taken along the line A—A of FIG. 2.

Erase cores 2 each have an erase gap 6 are provided so as to hold a R/W core 1 having a R/W gap 5 therebetween. These cores 1 and 2 constitute a magnetic converter or transducer unit 7 together with a R/W core and an erase core (not shown). Slider members 8 and 9 are provided so as to hold the magnetic converter unit 7 therebetween. The slider members 8 and 9 consist of slider base portions 8a and 9a, and transparent slider surface portions 8b and 9b of glass or other similar material. The slider base portions 8a and 9a are formed by ceramics or synthetic resin moldings obtained by mixing a suitable filler into, for example, polyphenylene sulphide (PPS), which has substantially the same coefficient of thermal expansion as that of the cores 1 and 2. The slider surface portions 8b and 9b are processed as a slidable surface so that their surfaces are in smooth contact slidable with the disk.

The magnetic head device further includes a base body 10 formed of ceramics or synthetic resin, or other similar material which has substantially the same coefficient of thermal expansion of that of the cores 1 and 2. At a position corresponding to the slider member 8 of the base body 10, an offset or step portion 10a is formed. A lens 11 is fitted into the step portion 10a. Behind the lens 11, a light emitting diode 12 is provided and spaced therefrom by a distance h. A light emitting unit 13 comprises the lens 11 and the light emitting diode 12. On the other hand, a photo detector 14 is disposed at a position corresponding to the slider member 9 of the base body 10, constituting a light receiving unit 15. The photo detector 14 is provided on a projection 10b of the base body 10 and is covered with a cover 16 having slits 16a. Each slit 16a is aligned parallel to the center line of the R/W core 1 and a predetermined one is spaced from the center line by a predetermined distance l. Reference numerals 17 and 18 denote terminals and lead lines, respectively.

Figure 4:
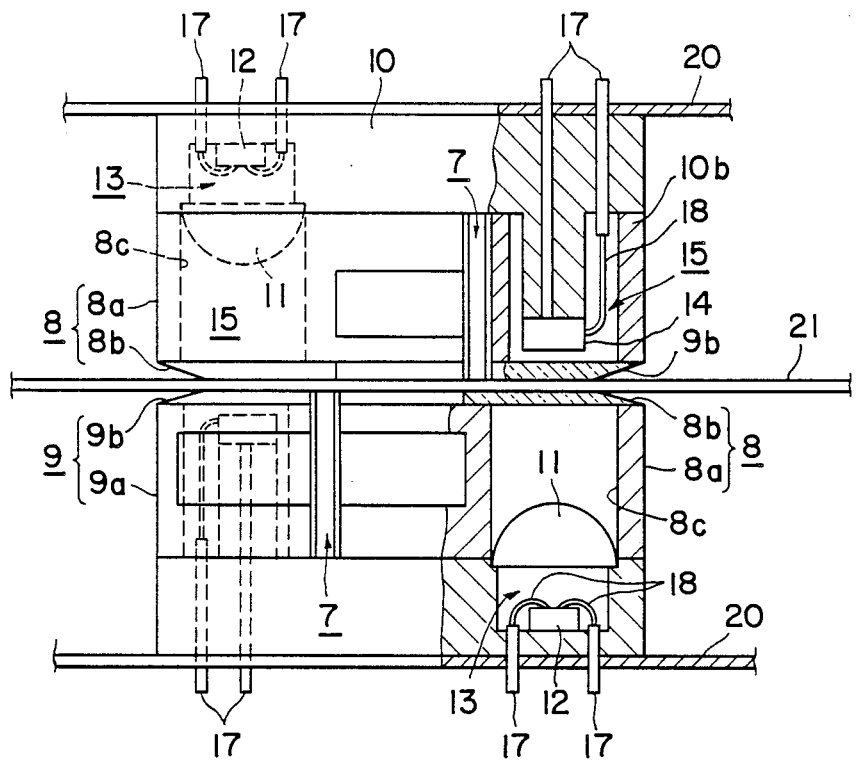
FIG. 4 is a partial cross sectional side view showing a pair of magnetic head devices of an embodiment according to this invention as mounted on a disk device.
Figure 6:
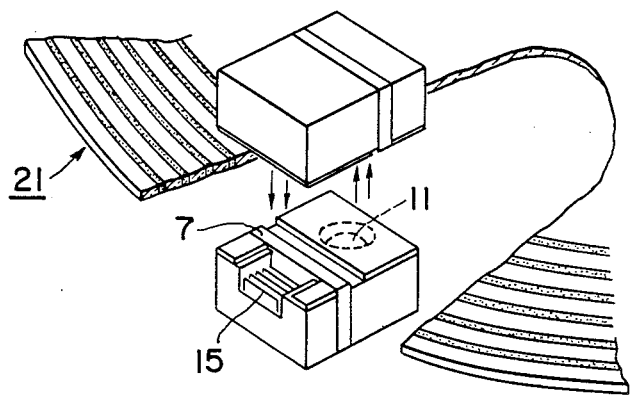
FIG. 6 is a perspective view showing the light emitting unit and the light receiving unit between which the disk is interposed.

In the slider member 8, an optical path 8c is formed at a position corresponding to the light emitting unit 13. Light from the light emitting diode 12 is irradiated by lens 11 in the direction toward the disk without being scattered. A hollow portion 19 into which the light receiving unit 15 is accommodated is formed in the slider member 9. As shown in FIGS. 4 and 6, by allowing the light emitting unit 13 and the light receiving unit 15 to be disposed oppositely each other so as to interpose the disk 21 therebetween, there is formed an optical track position sensor unit for sensing a pattern formed on the disk for an optical tracking servo. As shown in FIG. 4, the base body 10 is affixed onto a support comprised of a gimbal spring 20.

Figure 5A:
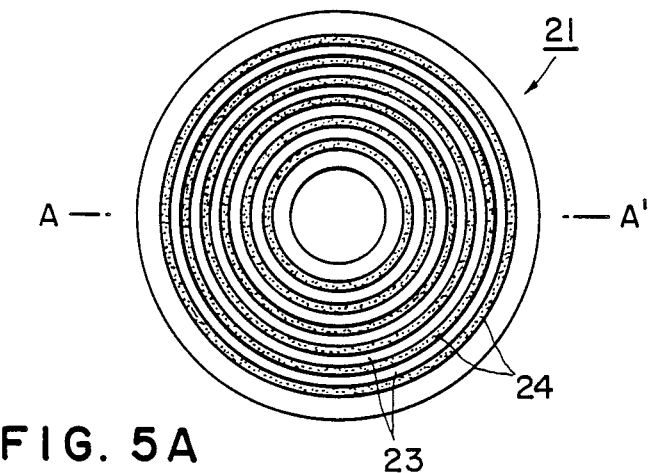
FIG. 5A is a plan view showing the track configuration of a magnetic disk medium to which read/write operations are performed using a magnetic head of this invention.
Figure 5B:
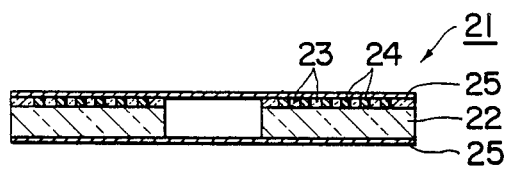
FIG. 5B is a cross sectional view of FIG. 5A.

FIG. 5A is a plan view showing a recording medium 21 which may be used with the magnetic head device of this invention and FIG. 5B is a cross sectional view taken along the line A—A' of FIG. 5A. As seen from these figures, the recording medium comprises light transmissive layers 23 and light non-transmissive layers 24, both of which have a thickness of about 3 $\mu$m and are alternately arranged in a stripe manner by turns, formed on a transparent polyester base body 22 having a thickness of approximately 75 $\mu$m, and a pair of magnetic layers 25 each having a thickness of about 1 $\mu$m formed on the surface of these layers interposing them. The light transmissive layer 23 and the light non-transmissive layer 24 may be formed by providing a silver photo layer such as silver chloride in gelatin form exposed to a light with a mask of a stripe pattern. It is to be noted that because the magnetic layer 25 is thin, it does not adversely affect transmission of infrared light projected from the side of the magnetic layer 25. The light transmissive layer 23 and the light non-transmissive layer 24 are arranged at a pitch equal to that of the light receiving elements which will be described later.

Figure 7:
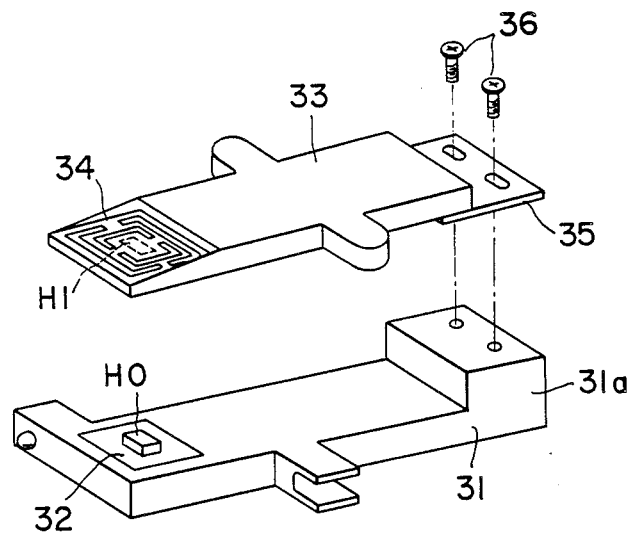
FIG. 7 is a perspective view showing magnetic heads H0 and H1 mounted on the carriage.
Figure 8:
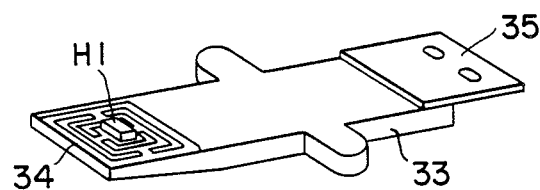
FIG. 8 is a perspective view showing a back of FIG. 7 in which magnetic head H1 is fixed on the back side of the arm.

FIG. 7 shows how magnetic heads HO and H1 are mounted on the carriage. This is somewhat different from the mounting arrangement shown in FIG. 4. As shown in FIG. 4, two magnetic heads are both attached to the gimbal 20. On the contrary, as shown in FIG. 7, one magnetic head HO is rigidly attached to a carriage 31 through a supporting plate 32 and the other magnetic head H1 is attached to the center of a gimbal 34 provided at the end portion of the arm 33. It is to be noted that since the magnetic head H1 is provided on the back side of the gimbal 34, a thin plate 35 having resiliency is attached to the opposite end portion of the arm 33 by, for example, spot welding and the thin plate 35 is screw connected to the step portion 31a of the carriage 31. FIG. 8 is a perspective view showing a back of the arm 33 in which magnetic head H1 is fixed on the back side of the arm at the central portion of the gimbal 34 as illustrated.

Figure 9:
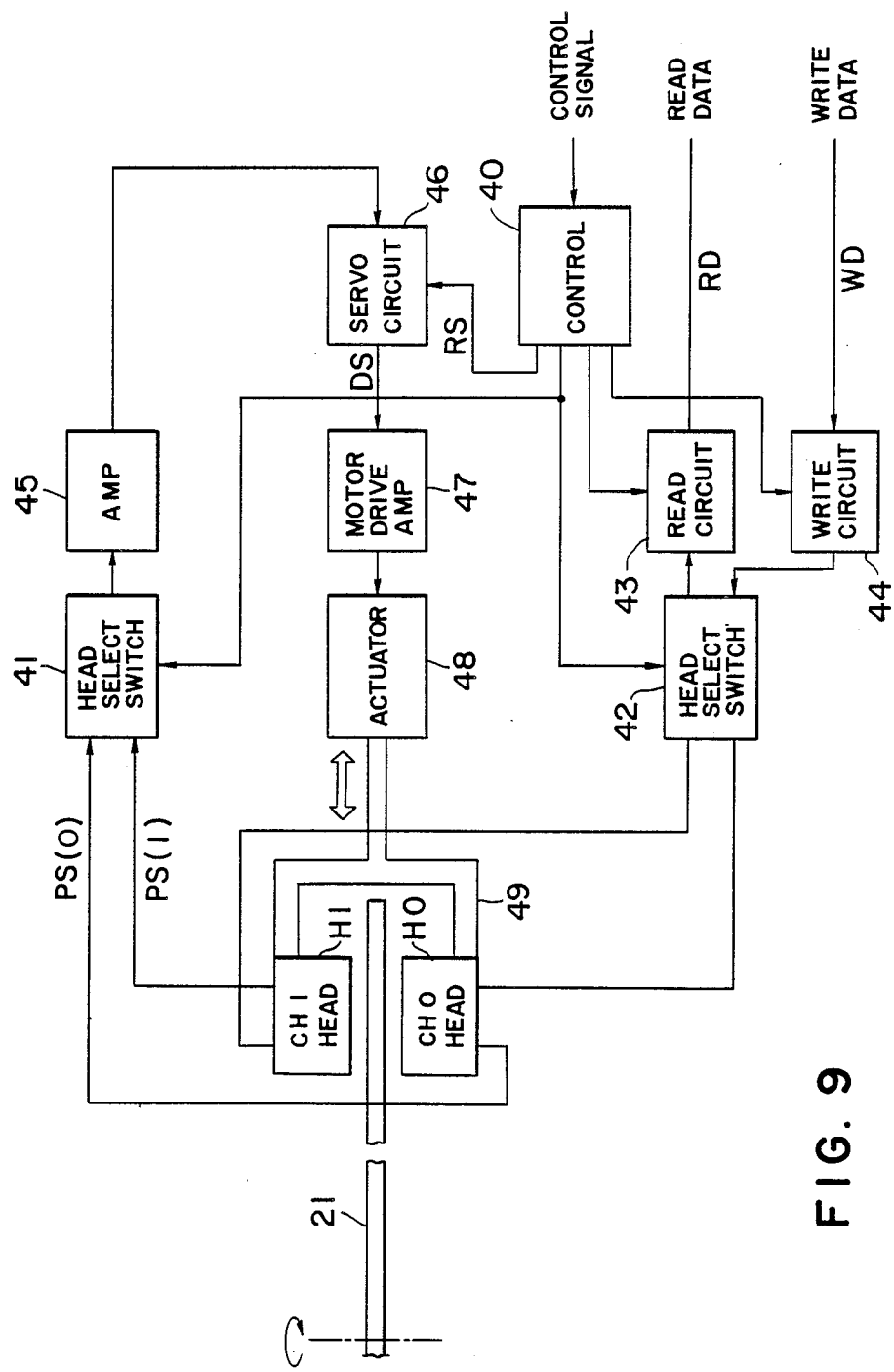
FIG. 9 illustrates a circuit block diagram for a magnetic disk device of this invention.

A circuit diagram of the magnetic disk drive related to this invention is shown in FIG. 9.

Outputs from the heads "HO" and "H1" provided so as 25 to interpose the disk 21 therebetween are input to two head select switches 41 and 42. These select switches 41 and 42 are switched by a control unit 40 depending upon which side of the disk 21 is used. It is to be noted that the head select switch 42 is used for magnetic head section and the head select switch 41 is used for switching optical servo operation of the two heads. The switches are adapted to concurrently select one of two sides of the disk 21.

An output from the head HO input to the head select switch 42 is output as read data RD from a read circuit 43 controlled by the control unit 40. Conversely, write data WD delivered from an external device is written onto magnetic tracks of the disk 21 through a write circuit 44 and the head select switch 42 controlled by the control unit 40.

Position signals $PS_0$ and $PS_1$ taken from optical tracks for servo control are input to an amplifier 45 via the head select switch 41. The signal amplified in this amplifier is delivered to a servo circuit 46. A reference position signal RS is delivered from the control unit 40 to the servo circuit 46. This reference position signal RS and the position signal PS are compared with each other at the servo circuit 46. A deviation signal DS obtained by comparing the two signals is delivered to a motor drive amplifier 47. The signal amplified drives an actuator 48. The actuator 48 to move the carriage and a set arm 49, so that the head precisely traces the optical servo tracks. Accordingly, the magnetic converter units assembled in the heads HO and Hl are positioned precisely on the magnetic track.

The servo operation in this magnetic disk drive will now be described with reference to FIG. 10.

As described above, two heads HO and Hl are opposite to each other so as to interpose the disk 21 therebetween. A light, such as, for example, an infrared light emitted from the light emitting diode 12 of the head Hl is formed into a parallel light by the lens 11. The parallel light thus obtained is transmitted through the transparent slider surface 8b, the disk 21, and the transparent slider surface 9b and is then irradiated to light receiving elements $A_1$, $C_1$, $B_1$, $D_1$, ... of the head HO.

Among these light receiving elements $A_1$, $C_1$, $B_1$, $D_1$, ..., light receiving elements A ($A_1$, $A_2$, ... $A_n$) and C ($C_1$, $C_2$, ... $C_n$) are arranged so that a change in output voltage therefrom produced when moving the head in a direction across the tracks provides two position error signals the phases of which are shifted relative to each other by an angle of 90 degrees. Further, light receiving elements B ($B_1$, $B_2$, ... $B_n$) and D ($D_1$, $D_2$, ... $D_n$) are arranged at positions phase-shifted by an angle of 180 degrees with respect to light receiving elements A and C, respectively. It is to be noted that light receiving elements A, B, C and D sense a plurality of tracks to average signals sensed, such as, for example, n=4. The light receiving combinations of A-B and C-D are used to double signals for eliminating common noises.

In addition, an electromagnetic converter unit MAG 1 and an electromagnetic converter unit MAG 0 are provided respectively on the sides of heads Hl and HO, which are adjacent to the respective photo detector unit as previously described.

FIG. 11 is a signal diagram showing position error signals $S_A-S_B$ and $S_C-S_D$ obtained from light receiving elements A, B, C and D and the optical tracks shown in FIG. 10. The positioning of the electromagnetic converter unit MAG 0 is carried out by adjusting the head HO to zero crossing points ($P_0$, $P_1$, ... $P_m$) of the signal $S_A-S_B$.

The direction in which the head position is shifted is detected by the polarity of the signal $S_Z-S_B$ within a range of ½ pitches left and right. In FIG. 11A, $P_0$, $P_1$, ... are convergence points of the servo operation. In transition from a seek operation mode in which the head moves to another track to a tracking operation mode in which the head tracks the convergence point within a target track, when traveling pass turning points $P_H$ and $P_L$ of the signal $S_A-S_B$, the turning point $P_L$, for example, may be noted. At this time, if the output level of the signal $S_A-S_B$ represents "$Y_L$", it is difficult to determine whether this value corresponds to the position $P_{L1}$ or $P_{L2}$. To overcome this, if attention is drawn to an output of comparison with "0" of the signal SC-SD, it is seen that the value concerned corresponds to $P_{L1}$ when that output is "1" and $P_{L2}$ when that output is "0" as shown in FIG. 11B. Accordingly, by examining the signal $S_C-S_D$, fast convergence during the transition from the seek operation to the tracking operation can be achieved.

Meanwhile, various kinds of servo control systems have been conventionally adopted in order to precisely extract a signal from an optical disk on which signal bit trains are concentrically formed in, such as, for example a compact disk (CD) player, or an optical disk player. Such servo control systems generally include a focus servo system for automatically focusing a lens with respect to a light spot on the optical disk, and a tracking servo system for correctly positioning the light spot with respect to the signal bit train, and other components. In principle, these systems provide a photo detector unit for determining the position or state of a light spot on the optical disk in a manner whereby a plurality of light receiving elements which are independent of each other each produce a light detection signal in correspondence to a quantity of incident light. The light receiving elements are arranged in a predetermined pattern according to circumstances to thereby constitute a photo detector head chip to sense a voltage distribution produced.

Accordingly, along with the need to further increase a density of the signal bit train and of the bit interval in a device for attaining high density recording, it is necessary to further reduce the diameter of light spot and the configuration and adjacent intervals of the independent light receiving elements. To realize this, it is necessary to provide the photo detector unit with high resolution without deteriorating the separation characteristic between independent light receiving elements.

The photo detector head chip mentioned above is constructed such that p-type or n-type regions are formed on the side of the surface of a wafer to thereby form an array of a plurality of rectangular light receiving elements serving as a light sensitive area and to form a light insensitive area which is not sensitive to light not incident on the light receiving elements. However, when viewed from a practical point, the light sensitivity (Y- coordinate) is graphically seen as a gentle curve as shown at 56 in FIG. 13B. The boundary portion where the light sensitive area and the light insensitive area adjoin each other indicate that sufficient resolution cannot be obtained.

For this reason, thin film formation methods such as sputtering a shielding thin film made of light non-transmissive material, e.g., aluminum, or gold, etc. have been proposed for preventing a light spot from being incident to the boundary portion between the light sensitive and insensitive areas for covering the light insensitive area arranged between light receiving areas and a portion of the light sensitive area. However, a satisfactory square waveform characteristic is not obtained by this method.

The inventor of this invention has found that one of the problems is that a thin film having a large coefficient of reflection, e.g., aluminum or gold, etc. formed as a shielding film reflects and scatters incident light at portions in the vicinity of light insensitive and sensitive areas, with the result that a portion of rays of scattered light reaches the light receiving elements, thus attenuating the characteristic of the light receiving sensitivity curve.

Figure 12A:
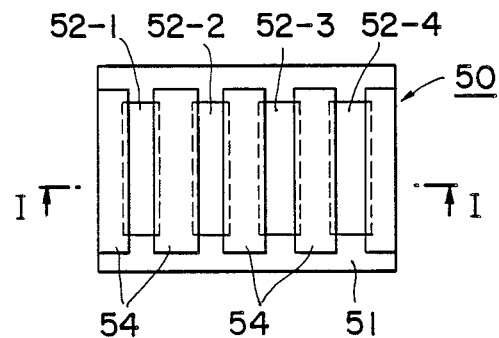
FIG. 12A is a plan view showing a photo detector head chip of this invention.
Figure 12B:
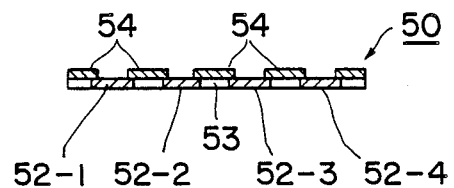
FIG. 12B is a cross sectional view taken along the line I—I of FIG. 12A.

FIGS. 12A and 12B show the structure of a photo detector head chip 50 devised on the basis of the discovery as mentioned above.

In this embodiment, four light receiving elements 52-1, 52-2, 52-3 and 52-4 are arranged in parallel on a wafer 51 and shielding films 54 of material having a small coefficient of reflection, are formed by sputtering on light insensitive sections 53 between respective light receiving elements. The material used may be, for example, molybdenum or carbon at a thickness of 0.1 to 2 $\mu$m.

Figure 13A:
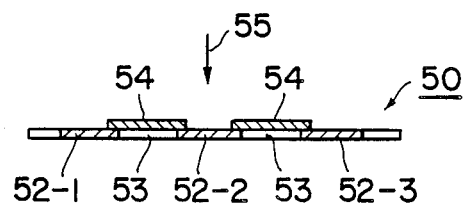
FIG. 13A is an enlarged view of FIG. 12B.
Figure 13B:
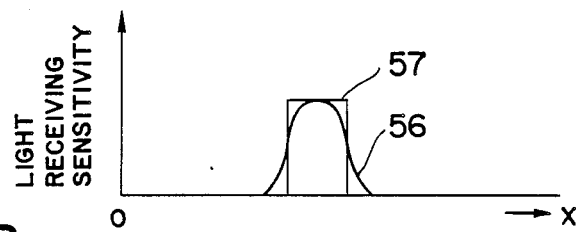
FIG. 13B is a graph showing, in a comparative manner, respective light receiving sensitivity characteristics when light is received by the photo detector head chip of the present invention as compared with that received by a conventional one.

When the above-mentioned configuration is employed, a light 55 incident toward the light insensitive sections 53 is absorbed by shielding films 54 having a small coefficient of reflection, whereby scattering of light is suppressed or controlled. Thus, the light sensitivity curve does not become the conventional gentle characteristic 56 as shown in FIG. 13B, but becomes an ideal square characteristic 57, resulting in a photo detector head chip having high resolution characteristic.

The present invention may also be applicable to photo detector head chips for other tracking systems and/or other focusing systems.

Figure 14A:
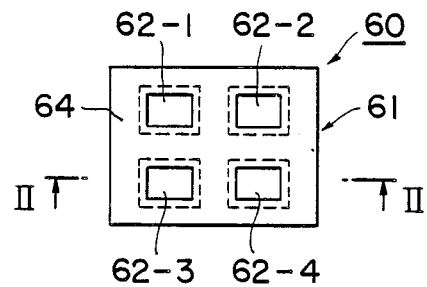
FIG. 14A is a plan view showing another embodiment of the photo detector head chip.
Figure 14B:
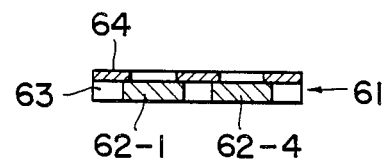
FIG. 14B is a cross sectional view taken along line II—II of FIG. 14A.

FIG. 14A is a plan view showing a photo detector head chip 60 according to a second embodiment of this invention, and FIG. 14B is a cross sectional view taken along line II—II of FIG. 14A.

In this example, four square light receiving elements 62-1 to 62-4 are arranged on a wafer 61 so as to form a matrix having two rows and two columns. The shielding film 64 is formed continuously to respective light insensitive sections 63 except at the light receiving elements 62-1 to 62-4.

Figure 15:
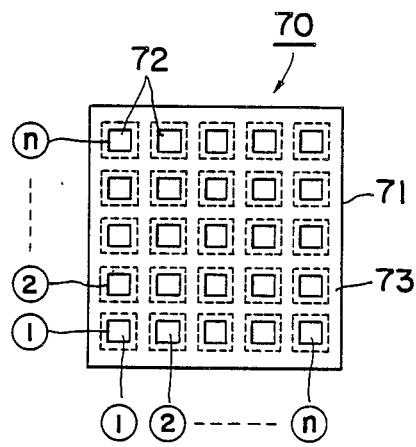
FIG. 15 is a plan view showing a third embodiment of the photo detector head chip.

FIG. 15 is a plan view showing a photo detector head chip 70 according to a third embodiment of this invention. This embodiment comprises smaller regular light receiving elements 72 arranged so as to form a matrix having n rows and n columns. The shielding film 73 is continuous except at the light receiving elements in the same manner as in the second embodiment.

Figure 16:
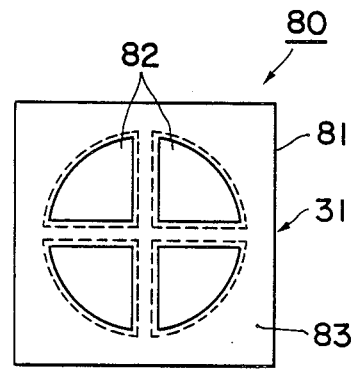
FIG. 16 is a plan view showing a fourth embodiment of the photo detector head, chip.

FIG. 16 is a plan view showing a photo detector head chip 80 according to a fourth embodiment of this invention. Each light receiving element 82 is formed as a quadrant on a wafer 81. The shielding film 83 is continuously formed except at respective light receiving elements.

Figure 17A:
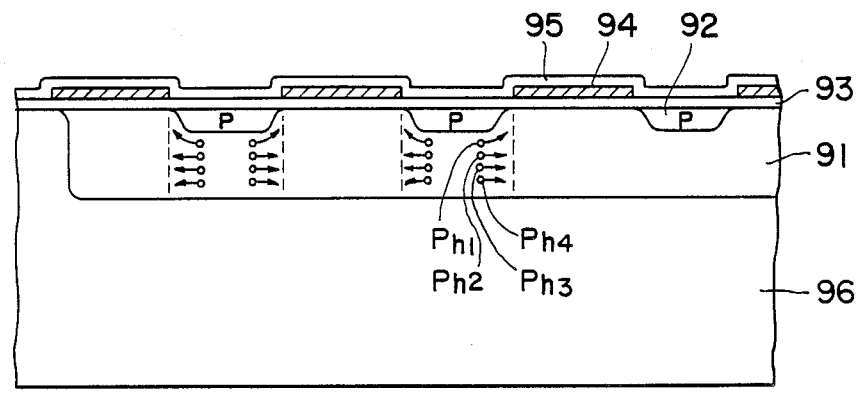
FIG. 17A is a cross sectional view showing the structure of a photo detector head chip of this invention.

FIG. 17A is a detailed cross sectional view of the structure of the head chip shown in FIG. 12A.

An n-layer 91 serving as an n-well is formed on the side of the surface of the substrate so that it has a thickness of 3.5 to 5 $\mu$m. First p-layers 92 are formed on the side of the surface of the n-layer 91 within wells thereof at predetermined pitches so that they have a thickness of 0.6 to 1 $\mu$m. These layers constitute semiconductor photo detector elements. A known insulating film 93 for preventing dark current and/or surface leakage current produced from the semiconductor photo detector elements to improve the S/N ratio is formed on n-layer 91 and the first p-layers 92. Light shielding films 94 of 1 $\mu$m thick molybdenum are formed on the insulating film 93 and between portions where first p-layers 92 are formed under the insulating film 93. Furthermore, a known protective layer 95 of a silicon oxide film is formed over the entirety. In addition, a second p-layer 96 having a thickness of 200 to 600 $\mu$m is formed below the n-layer 91. It is to be noted that power supply to respective conductive layers are conducted by means of a conductive layer of lead patterns (not shown) provided below the insulating film 93 according to a known arrangement.

The structure of the head chip is explained as above, but the actual manufacturing process starts by preparing the second p-layer 96 as a substrate, the n-layer 91, the first p-layers 92, the conductive layer (lead patterns), the insulating film 93, the light shielding films 94, then the protective layer 95 in that order.

In this example, the molybdenum light shielding film 94 is a film having a low coefficient of reflection with respect to light and having a sufficient light shielding characteristic. Thus, this film serves to prevent the adverse effect of reflection.

Figure 17B:
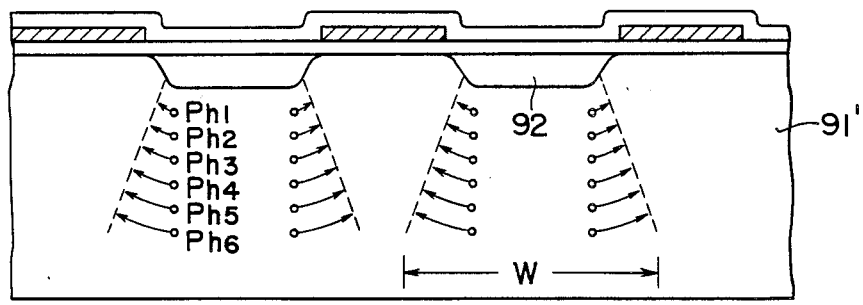
FIG. 17B is a cross sectional view showing the structure of a conventional photo detector head chip.

By forming the n-layer 91 so that it is extremely thin, the following advantage will be provided. Prior to the description of this advantage, the structure of a conventional head chip is shown in FIG. 17B for comparison. Because n-layer 91' has a thickness on the order of 200 to 600 $\mu$m, much thicker than 3.5 to 5 $\mu$m of the present invention, incident infrared light reaches a deep layer having a depth of about 30 $\mu$m within the n-layer. As a result, because photons $Ph_1$, $Ph_2$, . . . produced are drawn toward the adjacent p-layers and are spread or diffused, as a quantity of photons which diffuses vertically into the thickness of the substrate increases relative to the distance from the surface. Namely, a virtual apparent detection width W at the deep layer portion becomes broader, resulting in lowered resolution.

In contrast, in the case of this embodiment of the present invention, a quantity of the diffusion does not become large because the n-layer 91 is extremely thin in comparison, and diffusion of photons $Ph_1$, $Ph_2$, . . . is controlled to be limited by maintaining the potential on the second p-layer 96 at zero or a negative value with respect to the n-layer 91. Thus, resolution can be improved.

It is to be noted that lead patterns may be independently provided for respective p-layers 92, thereby making it possible to operate them as a plurality of independent photo detector elements.

The operation of an embodiment of a magnetic head mentioned above will be described. Under the condition where the magnetic converter unit 7 and the slider members 8 and 9 are combined in one body, various electrical performances and magnetic characteristic of the magnetic converter unit 7 are checked. On the other hand, a distance h between lens 11 and light emitting diode 12 is adjusted and set on the side of the base body 10, and a distance l between the slit 16a and R/W core 1 and the parallel alignment thereof, are adjusted and set, or similar necessary operation is achieved. Adjustment in attachment of optical parts is performed in the above-mentioned manner. Thereafter, the slider members 8 and 9 and the base body 10 are bonded and are incorporated into one body. In this condition, the light emitting unit 13 and the light receiving unit 15 are covered with slider members 8 and 9, respectively. Thus, they are screened from the externals. The base body 10 is fitted over the support 20 to form a magnetic head device.

The magnetic head device is affixed, as shown in FIG. 7, at one side thereof to the carriage and at the other side thereof to the set arm provided swingably on the carriage. The magnetic head device as assembled is mounted on the disk drive and positioned so that the disk 21 is interposed therebetween. The light emitting unit 13 and the light emitting unit 15 are opposite each other, and form a pair of optical track position sensor units to sense light transmitted through a tracking servo pattern formed on the disk 21, thereby providing a tracking servo arrangement. When the disk 21 rotates, slider surface portions 8b and 9b are slidably in contact with the surface of the disk 21. Thus, the magnetic converter unit 7 becomes in contact with the disk 21 to conduct read/write of the data signal.

At this time, the optical track position sensor units serve to control the position of the carriage by the detected output, thus allowing the magnetic converter unit 7 to correctly scan on the tracks. At this time, when read/write operations by the lower magnetic head are performed, one optical track position sensor unit becomes operative. When read/write operations by the upper magnetic head are performed, the other optical track position sensor unit becomes operative.

In the optical track position sensor unit, light from the light emitting unit 13 reaches the tracking servo pattern on the disk 21 through the transparent slider surface portion 8b to reach the light receiving unit 15 through the slider surface portion 9b for a second time. In the light receiving unit 15, incident light is received through the slit 16a. Thus, because the distance l between the slit 16a and the core 1 is precisely set in advance, tracking servo of the core 1 is conducted.

Since the slider members 8 and 9, and the base body 10 have substantially the same coefficient of thermal expansion as that of the cores 1 and 2, failure does not occur such that any change in temperature causes a deformation, thus allowing an adhesive agent to be exfoliated. Moreover, since the light emitting unit 13 and the light receiving unit 15 are covered with slider members 8 and 9, there is no possibility that dust intrudes from the outside, which may otherwise produce a problem in the optical tracking servo.

In addition, in the light receiving unit of the head chip, light shielding films having a small coefficient of reflection formed on the light insensitive sections prevent reflection and/or scattering to reduce an error in the photo detector output, to improve resolution.

It is to be noted that while the magnetic transducer unit 7 is composed of a core for erasing and a core for R/W integrally assembled, such a transducer unit may be composed of only a core for R/W. The positions of the light emitting unit 13 and the light receiving unit 15 with respect to the slider may be arbitrarily adjusted. In addition, while the light emitting unit 13 and the light receiving unit 15 are mounted on the base body 10 in the above-mentioned embodiment, only one of them may be mounted. Such a unit is mounted and applied to read/write from and to one side of the disk 21.

The above description is intended by way of example only and is not intended to limit the present invention in any way except as set forth in the following claims.

What is claimed is:

1. A magnetic head device comprising:
   a magnetic converter unit and a slider member for holding the magnetic converter unit for recording signals to and reproducing from a recording medium, a base body having an optical sensor affixed thereto for controlling the position of said magnetic head device relative to said recording medium, and a transparent slider surface portion forming an optical path of the optical sensor,
   said optical sensor being provided with a photo detector head chip having a plurality of light receiving element sections formed on the surface of a substrate and defining a light sensitive area for providing independent light detection signals depending upon the quantity of an incident light and light insensitive sections adjacent to said light sensitive area alternatively formed on the surface of said substrate, at least said insensitive sections being covered thereon with a light shielding film having a small coefficient of reflection.

2. A magnetic head device as set forth in claim 1, wherein said slider member and said base body are formed by a material having substantially the same coefficient of thermal expansion as that of a core constituting said magnetic conversion unit.

3. A magnetic head device as set forth in claim 1, wherein said slider member is fitted over said base body so as to cover said optical sensor.

4. A magnetic head device as set forth in claim 1, wherein said light receiving element section being p-type layers formed on an n-type layer, said n-type layer being formed on a further p-type layer, the n-type layer having a thickness less than that of said further p-type layer.

5. A magnetic head device as set forth in claim 4, wherein said light shielding material having a small coefficient of reflection is selected from a group of molybdenum and carbon.

6. A magnetic head device as set forth in claim 4, wherein said light shielding film is formed over the n-type layer, an insulation film is disposed between said light shielding film and said n-type layer.

* * * * *